United States Patent [19]

Takaoka et al.

[11] Patent Number: 4,525,046
[45] Date of Patent: Jun. 25, 1985

[54] CASELESS CAMERA

[75] Inventors: Yukio Takaoka; Masaaki Morizumi; Norimichi Takahashi, all of Tokyo, Japan

[73] Assignee: Asahi Kogaku Kogyo Kabushiki Kaisha, Tokyo, Japan

[21] Appl. No.: 559,384

[22] Filed: Dec. 8, 1983

[30] Foreign Application Priority Data

Jan. 20, 1983 [JP] Japan ............................. 58-6245[U]

[51] Int. Cl.³ .............................................. G03B 15/03
[52] U.S. Cl. .................................. 354/149.11; 354/288
[58] Field of Search ............... 354/145.1, 149.11, 288, 354/126, 187

[56] References Cited

U.S. PATENT DOCUMENTS 4,261,658  4/1981  Uchiyama et al. .................. 354/126
4,452,519  6/1984  Fraser et al. ....................... 354/126

Primary Examiner—John Gonzales
Attorney, Agent, or Firm—Hill, Van Santen, Steadman & Simpson

[57] ABSTRACT

In a caseless camera, a cover plate having a contact member at the rear side thereof is slidably mounted at the front side of a camera body between its closing and opening positions. An electric flash mounted inside the camera body traversely movably between its restoring and operating positions is provided with an inclined step at the front side thereof. The contact member of the cover plate contacts and downwardly push the inclined step of the electric flash so as to return the electric flash to its restoring position, when the electric flash is in its operating position, upon the sliding movement of the cover plate from its opening positions to its closing position.

3 Claims, 5 Drawing Figures 4,525,046

CASELESS CAMERA

BACKGROUND OF THE INVENTION

This invention relates to a caseless camera, and more particularly an automatic returning mechanism for an electric flash built in a camera body from its operating position to its restoring position.

In caseless cameras, a cover plate is slidably arranged at the front side of the camera body so as to slide between its closing position to its opening position to cover and uncover photo-lens and finder mounted on the central area of the camera body. Further, an electric flash is built in the camera body so as to be protruded out of the camera body when it is utilized while it is usually restored inside the camera body.

In the prior arts, however, an user must manually protrude and return the electric flash out of and into the camera body each time when it is utilized, which is much troublesome for users.

SUMMARY OF THE INVENTION

Accordingly, it is an object of the invention to provide an improved caseless camera wherein a built-in electric flash is automatically returned to its restoring position after it is utilized upon the sliding movement of a cover plate.

According to this aspect, there is provided a caseless camera comprising: a camera body; a cover plate mounted at the front side of the camera body sliding between its closing and opening positions, said cover plate being provided with a contact member at the rear side thereof; an electric flash mounted inside the camera body longitudinally movably between its restoring and operating positions, said electric flash being provided with an inclined step at the front side thereof to be contacted with said contact member of the cover plate; and said electric flash being downwardly moved to its restoring position by the contact of said inclined step with said contact member, when the electric flash is in its operating position, upon the sliding movement of said cover plate from its opening position to its closing position.

DESCRIPTION OF THE PREFERRED EMBODIMENTS

Figure 1:
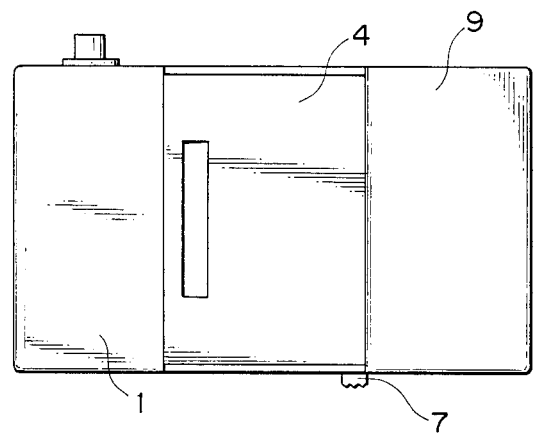
FIG. 1 is an elevational view showing a caseless camera embodying the invention.
Figure 2:
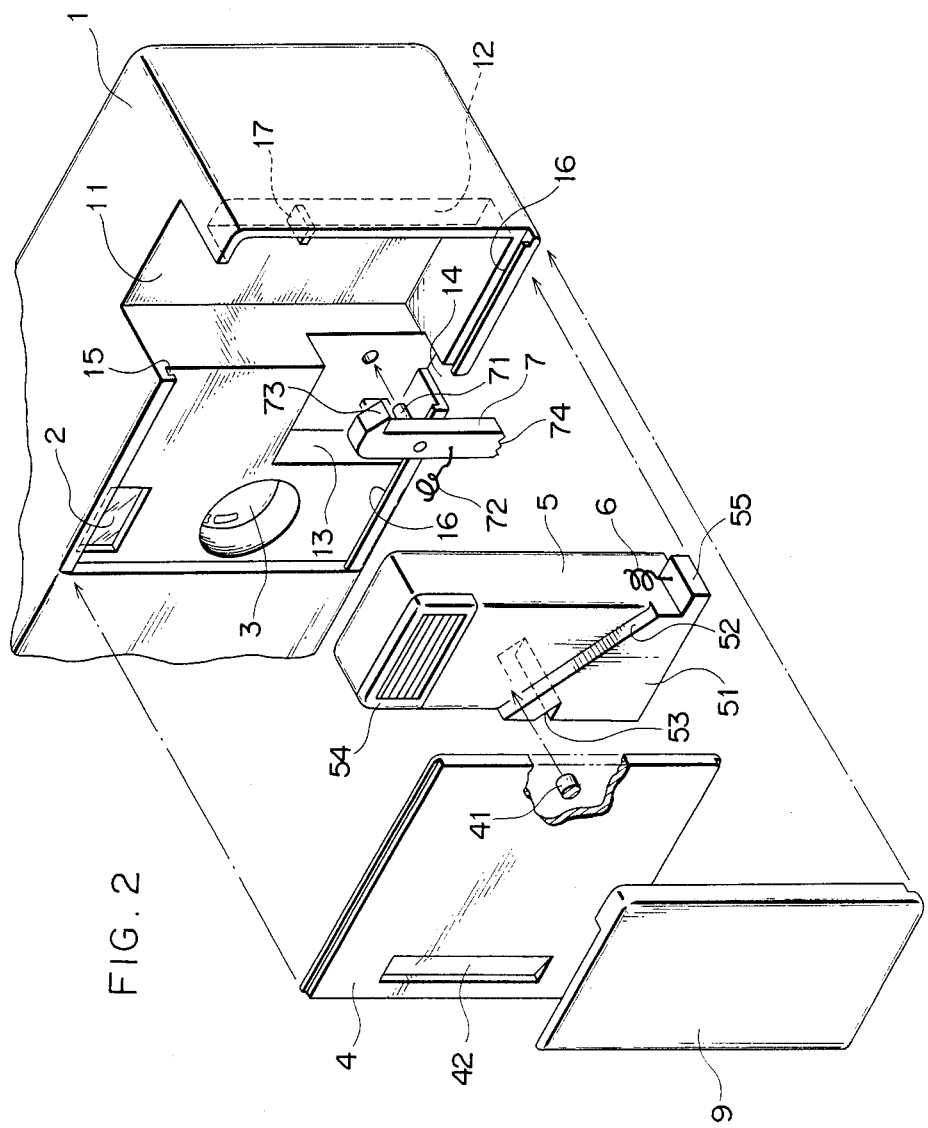
FIG. 2 is an exploded perspective view of the caseless camera illustrated in FIG. 1.

In the caseless camera illustrated in FIGS. 1 and 2, a cover plate 4 is traversely slidably mounted on a front side of a camera body 1 between a separated front plate 9 and the camera body 1 to cover and uncover a finder 2 and a photo-lens 3 arranged at the central area of the camera body 1. An electric flash 5 is longitudinally movably arranged inside the camera body 1.

The electric flash 5 is provided with an lower protruding portion 51, at the front side thereof, having an inclined top step 52 downwardly extending from left to right and horizontally extending side notch 53. The upper end of the electric flash 5 is provided with a lightning member 54.

The electric flash 5 is arranged inside a recess 11 formed at the front side of the camera body 1. A pair of recesses 12 and 13 are formed at the front side of the camera body 1 opposedly adjacent the recess 11. A spring 6 is interconnected between a base 55 protruded at the lower end of the electric flash 5 and a lug 17 formed at the upper portion of the recess 12 so as to upwardly bias the electric flash 5. A stopper 7 is swingably pivoted by a pin 71 in the recess 13 and biased to swing in the clockwise direction by a spring 72 anchored to the recess 13, a hook-shaped upper end 73 of which spring 7 is engaged with the side notch 53 of the electric flash 5 so as to restore the electric flash 5 inside the camera body 1 against the resilient force of the spring 6. The lower end 74 of the stopper 7 is protruded outwardly through a slot 14 formed at the bottom side of the camera body 1 so as to be manually rotated. The cover plate 4 is slidably inserted between and guided by a pair of grooves 15.16 formed on the upper and lower front edges of the camera body 1. At the rear side of the cover plate 4 provided is a pin 41 which engages the inclined step 52 of the electric flash 5. At the the front side of the cover plate 4 provided is a notch 42 for its manual sliding.

The traversing length of the inclined step 52 of the electric flash 5 is designed to be substantially equal to the sliding length of the cover plate 4, while the longitudinal length is designed to be substantially equal to that of the lightning member 54.

Figure 3:
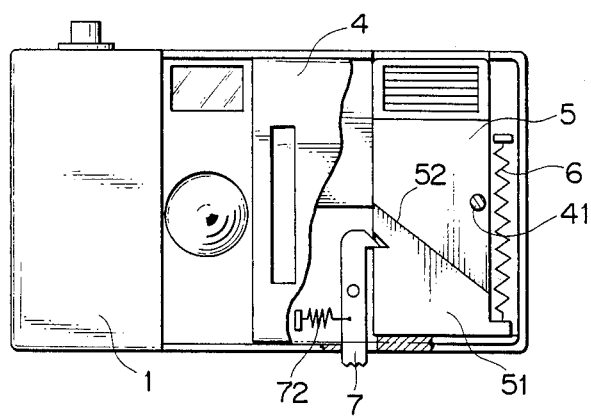
FIGS. 3 to 5 are partly cutaway elevational views of the caseless camera illustrated in FIG. 1 showing the relationship between a cover plate and an electric flash.
Figure 4:
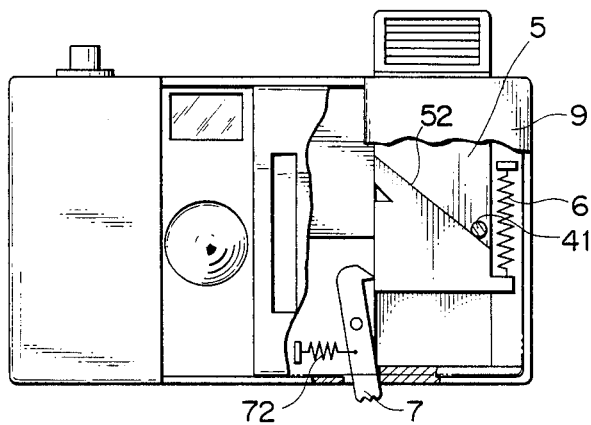

With the caseless camera as above constructed, when the cover plate 4 is slid to its opening position as shown in FIG. 3 and the stopper 7 is manually rotated in the counterclockwise against the biasing force of the spring 72, the hook-shaped upper end 73 of the stopper 7 is released from the engagement with the side notch 53 so that the electric flash 5 is upwardly moved by the biasing force of the spring 6 until the inclined step 52 reaches the contact member 41 of the cover plate 4 as shown in FIG. 4. At this stage, the lightning member 54 of the electric flash 5 is protruded out of the camera body 1 and it becomes ready for operation.

Figure 5:
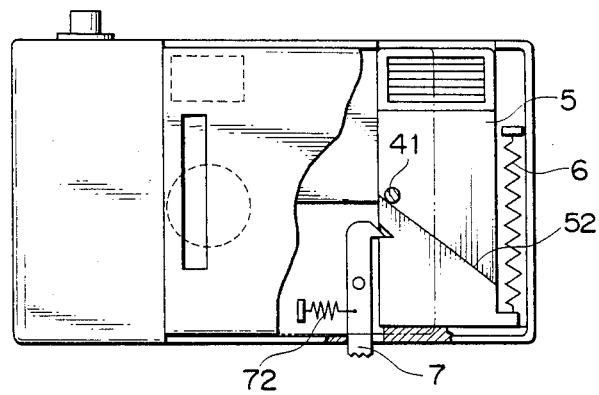

After having taken pictures, by sliding the cover plate 4 manually to its closing position, i.e., in the left direction in FIG. 4, the contact member 41 horizontally moves relatively to the electric flash 5 and downwardly pushing the inclined step 52 to move the electric flash 5 to its restoring positions. When the electric flash 5 reaches to its restoring position, the hook-shaped upper end 73 of the stopper 7 re-engage the side notch 53 of the electric flash 5 by the biasing force of the spring 72 and anchore it as shown in FIG. 5. Thus, the electric flash 5 is automatically retured to its restoring position upon the sliding movement of the cover plate 4 to its closing position.

What is claimed is:
1. A caseless camera comprising;
   a camera body;
   a cover plate mounted at the front of the camera body slidably between its closing and opening positions, said cover plate being provided with a contact member at the rear side thereof;
   an electric flash mounted inside the camera body longitudinally movably between its restoring and operating positions, said electric flash being provided with an inclined step at the front side thereof to be contacted with said contact member of the cover plate; and said electric flash being downwardly moved to its restoring position by the contact of said inclined step with said contact member, when the electric flash is in its operating position, upon the sliding movement of said cover plate from its opening position to its closing position.

2. The caseless camera according to claim 1 wherein said electric flash is biased to its operating position while it is anchored to its restoring position by a stopper which is manually operatable outside the camera body.

3. The caseless camera according to claim 1 wherein said electric flash is provided with a lightning member at the upper end thereof, and the longitudinal length of said inclined step is substantially equal to that of said lightning member while the traverse length of the inclined step is substantially equal to the sliding length of said cover plate.

* * * * *